(12) United States Patent
Bezek

(10) Patent No.: US 8,763,643 B2
(45) Date of Patent: Jul. 1, 2014

(54) TUBE FLOW TURBULATOR UTILIZING MULTIPLE SMALLER CHANNELS TO CREATE TURBULENCES AND HIGHER FLOW RATES

(76) Inventor: Stanko Bezek, Varazdin (HR)

(*) Notice: Subject to any disclaimer, the term of this patent is extended or adjusted under 35 U.S.C. 154(b) by 130 days.

(21) Appl. No.: 13/265,036

(22) PCT Filed: Apr. 19, 2010

(86) PCT No.: PCT/HR2010/000010
§ 371 (c)(1),
(2), (4) Date: Oct. 18, 2011

(87) PCT Pub. No.: WO2010/122361
PCT Pub. Date: Oct. 28, 2010

(65) Prior Publication Data
US 2012/0037260 A1 Feb. 16, 2012

(30) Foreign Application Priority Data
Apr. 21, 2009 (HR) .............................. P 20090233 A

(51) Int. Cl.
*F16D 1/04* (2006.01)
*F16L 9/22* (2006.01)

(52) U.S. Cl.
USPC ............................................ 138/39; 138/155

(58) Field of Classification Search
USPC .......... 73/861.63, 861.64; 138/37, 39, 40, 42, 138/44, 155; 406/92, 191, 195
See application file for complete search history.

(56) References Cited

U.S. PATENT DOCUMENTS

| | | | | | |
|---|---|---|---|---|---|
| 1,530,157 | A | * | 3/1925 | Edwards | 48/189.4 |
| 1,585,142 | A | * | 5/1926 | Gillett | 48/189.4 |
| 1,602,390 | A | * | 10/1926 | Butler | 48/189.4 |
| 1,739,161 | A | * | 12/1929 | McKee | 48/180.1 |
| 1,940,790 | A | * | 12/1933 | Diehl | 138/44 |
| 1,953,110 | A | * | 4/1934 | Holtane | 138/44 |
| 2,904,076 | A | * | 9/1959 | Eugel et al. | 138/26 |
| 2,938,464 | A | * | 5/1960 | Nielsen | 137/211 |
| 3,146,798 | A | * | 9/1964 | Chenault | 138/44 |
| 3,229,723 | A | * | 1/1966 | Janton | 138/44 |
| 3,417,970 | A | * | 12/1968 | Schwindy | 366/96 |
| 3,774,645 | A | | 11/1973 | Pompa | |
| 3,826,273 | A | * | 7/1974 | Brown | 137/1 |
| 3,894,562 | A | * | 7/1975 | Moseley et al. | 138/44 |

(Continued)

FOREIGN PATENT DOCUMENTS

| | | | | |
|---|---|---|---|---|
| DE | 2809005 A1 | * | 9/1979 | ............ B65G 53/04 |
| FR | 2 244 093 | | 4/1975 | |
| FR | 2 710 392 | | 3/1995 | |

OTHER PUBLICATIONS

International Search Report of PCT/HR2010/000010, date of mailing Dec. 21, 2010.

*Primary Examiner* — Kevin P Shaver
*Assistant Examiner* — Patrick M Buechner
(74) *Attorney, Agent, or Firm* — Collard & Roe, P.C.

(57) ABSTRACT

The tube flow turbulator, type TC-09/A-B, resulted from work in measuring and regulation technology, and resolving problems in this field of work. The tube flow turbulator solves the problem of dirt collection in control assemblies and enhances operation of a dirt collector. The advantage of the tube flow turbulator is that Maximally reduces necessity for human intervention, and resolves problems in cases where there are no dirt collectors. It is simply installed in a closed pipeline system, between pipeline and control assembly flanges with two seals.

2 Claims, 5 Drawing Sheets

(56) References Cited

U.S. PATENT DOCUMENTS

| | | | |
|---|---|---|---|
| 4,207,925 A * | 6/1980 | Nelson | 138/44 |
| 4,662,401 A * | 5/1987 | Zingg et al. | 137/824 |
| RE35,503 E * | 5/1997 | Hunter | 73/861.63 |
| 5,693,226 A * | 12/1997 | Kool | 210/541 |
| 5,810,052 A * | 9/1998 | Kozyuk | 138/37 |
| 5,937,906 A * | 8/1999 | Kozyuk | 138/37 |
| 2009/0199873 A1* | 8/2009 | Pruett | 134/22.12 |
| 2009/0261029 A1* | 10/2009 | Fisher | 210/232 |

* cited by examiner

TUBE FLOW TURBULATOR UTILIZING MULTIPLE SMALLER CHANNELS TO CREATE TURBULENCES AND HIGHER FLOW RATES

CROSS REFERENCE TO RELATED APPLICATIONS

This application is the National Stage of PCT/HR2010/000010 filed on Apr. 19, 2010, which claims priority under 35 U.S.C. §119 of Croatian Application No. P20090233A filed on Apr. 21, 2009, the disclosure of which is incorporated by reference. The international application under PCT article 21(2) was published in English.

FIELD OF THE INVENTION

This invention primarily describes tube flow turbulator for the following media: water, boiling water, wastewater, acids and leaches, at maximum temperature up to +350 degrees of Celsius and minimum temperature down to −20 degrees of Celsius.

TECHNICAL PROBLEM

This technical solution primarily solves the problem of dirt collection in control assemblies in pipeline systems.

STATE OF TECHNOLOGY

Until now the dirt collection problem in a pipeline system has been resolved by installation of a dirt collector, whose functionality depends on good and proper maintenance.

In FR 2 710 392 A1, U.S. Pat. No. 3,774,645 A and FR 2 244 093 A1 there are disclosed several solutions for venturi elements which show no explicit turbulent fluid flow, especially no vortexes and turbulences.

BACKGROUND OF THE INVENTION

The primary goal of the invention is safe operation and as low as possible dependence on human factor during application in a facility, i.e. pipelines.

The secondary goal of the invention is simple installation and use, possibility of use in the existing pipelines without additional changes. Proper selection of the tube flow turbulator material for certain media enables unlimited application at pipeline pressures up to PN 40.

Additional goals and advantages of the invention will be given in the further description and partially through a description of the invention application.

BRIEF DESCRIPTION OF DRAWINGS

Attached drawings, which supplement description of and are part of the invention, show until now, the best invention realization and help explaining basic operational principles.

DESCRIPTION OF AT LEAST ONE METHOD FOR INVENTION REALIZATION

Figure 1:
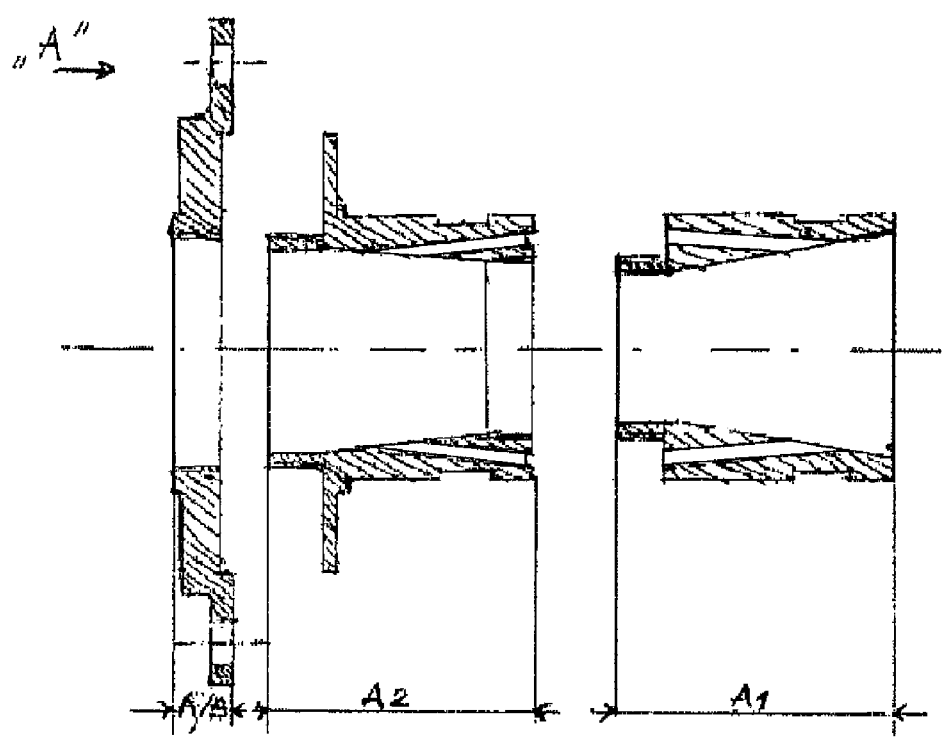
FIG. 1 Cross-section of the tube flow turbulator, "A" version
Figure 2:
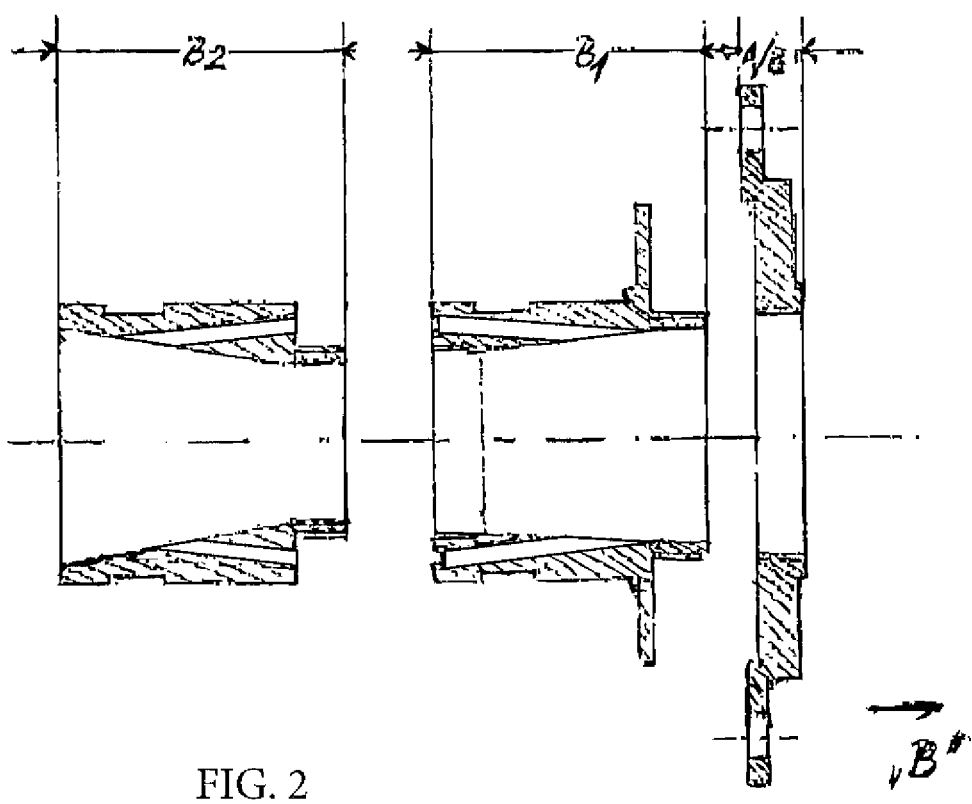
FIG. 2 Cross-section of the tube flow turbulator, "B" version
Figure 3:
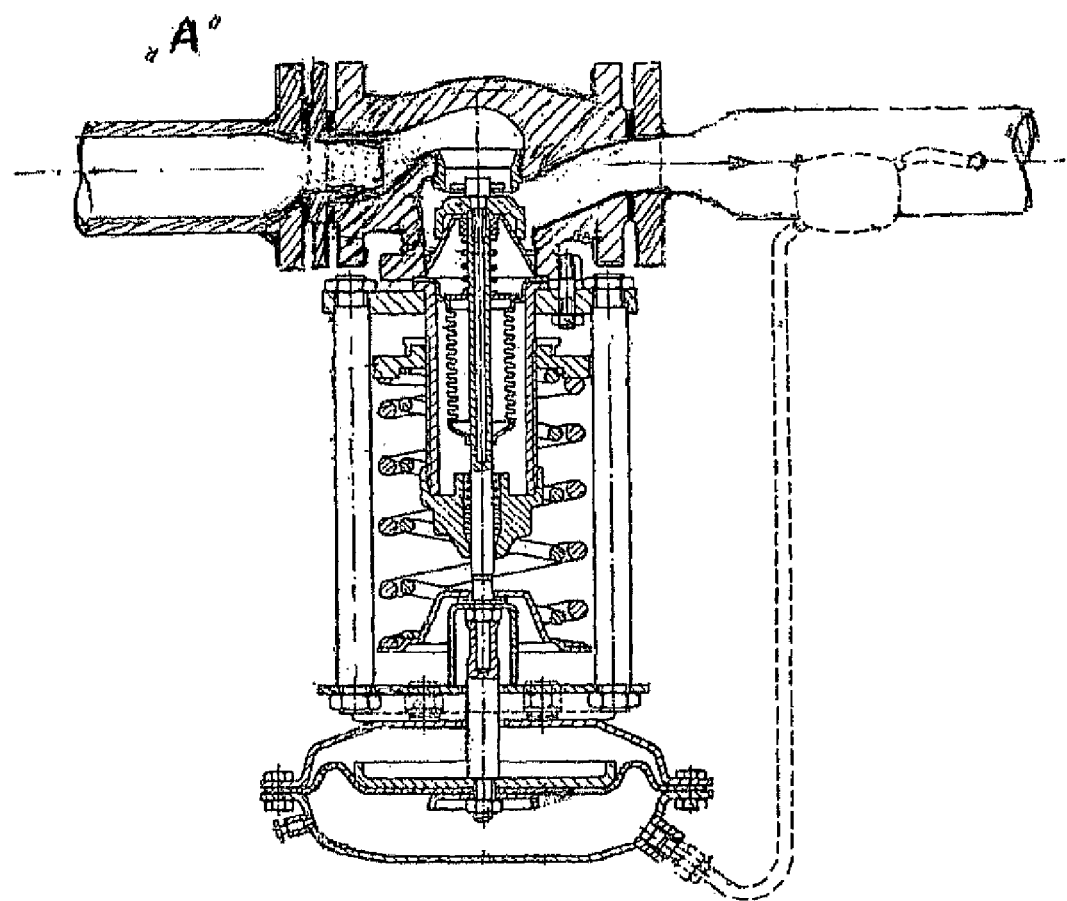
FIG. 3 Installation example: cross-section of a pressure regulator and the tube flow turbulator, "A" version FIG. 4 Installation example: cross-section of a pressure regulator and the tube flow turbulator, "B" version FIG. 5 Tube flow turbulator, type TC-09/"A", DN 50, PN 40
Figure 4:
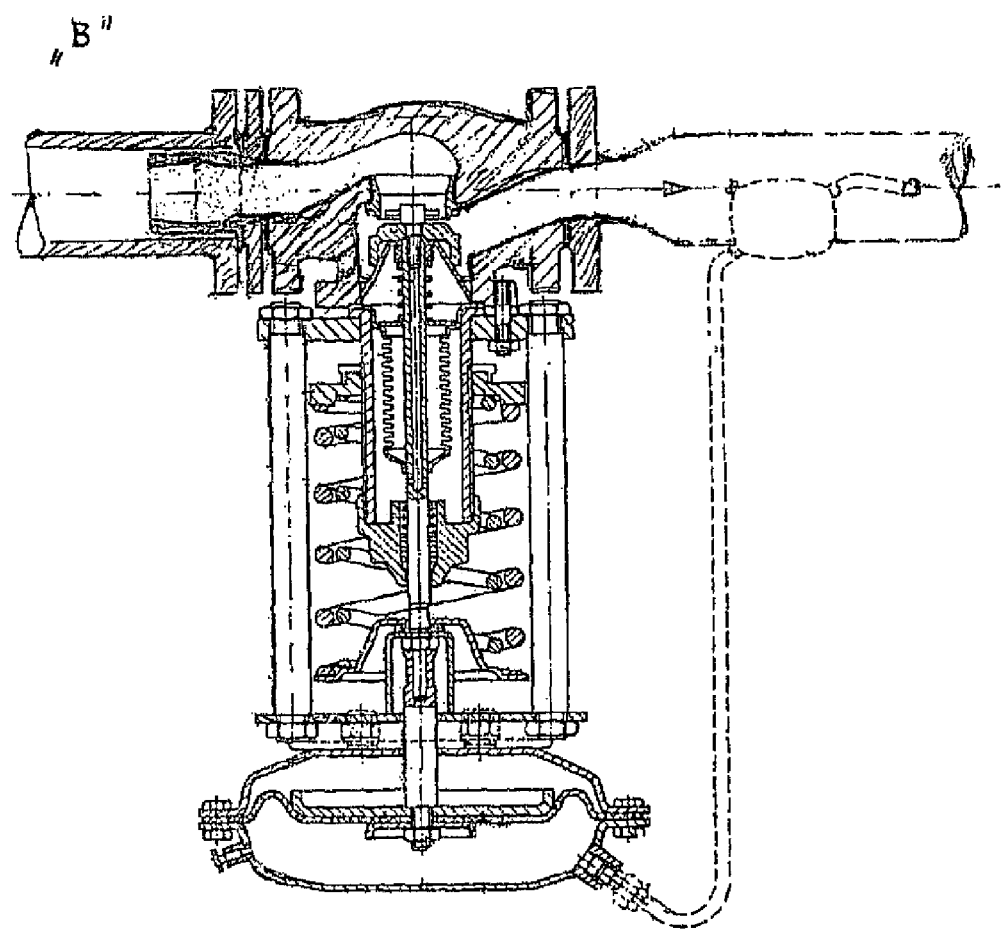
Figure 5:
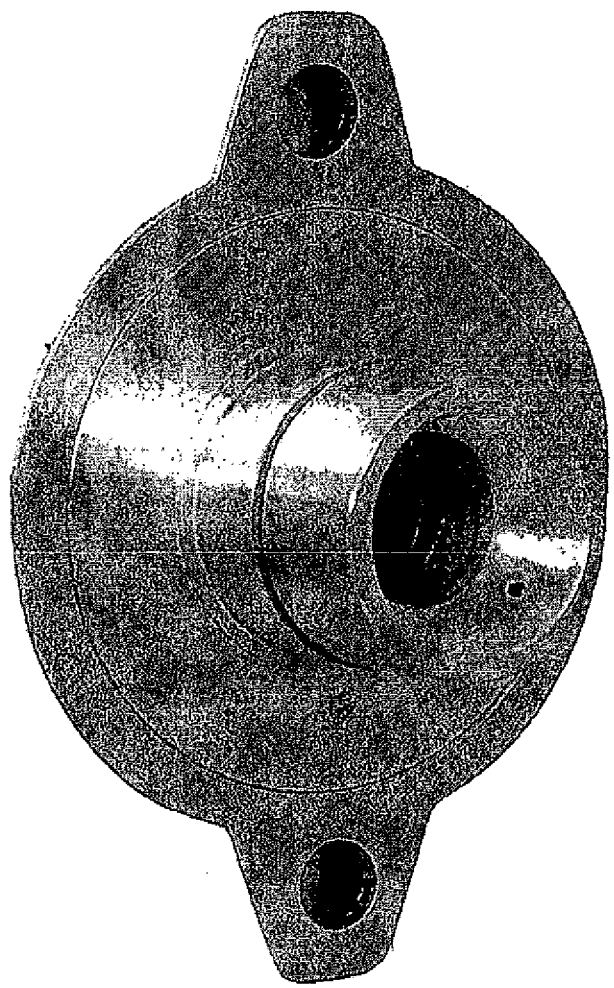

According to FIGS. 1-5, it can be seen that tube flow turbulator has autonomous operation in a closed pipeline system, and before control assemblies. As the invention name suggests, tube flow turbulator, with its technical and construction solution, creates turbulent media before a control assembly and keeps dirt particles "in the air", and by its turbulence and higher flow rate pushes them through the assembly. This prevents dirt collection in the assembly, and possible dosing and control errors. This is very useful with small flow rates and media with requested specific mass and density.

THE APPLICATION METHOD OF THE INVENTION

The tube flow turbulator, type TC-09/A-B is made of material depending on media, and in three (3) parts. The first part, flange part is the same for "A" and "B" version. The second part (A2 and B1) has the same installation length for certain rated opening (DN), but with 3 or more small channels on the cone side. The same is valid for the third part (A1 and B2), which has the opposite number of these channels on the exit cone. All three parts are connected by screwing onto each other, with two seals between the second and third part. On the second part toward the third part there is a circular channel, over which the small channels are connected.

The media which flows through a closed pipeline system also carries dirt particles, which are best collected with small flow rates and create big problems in control assemblies. This invention should at best resolve these issues. It is envisioned that this invention creates turbulent flow of the media before a control assembly. For this purpose, injectors are used, whose construction "presses" the media and releases it towards the assembly like from a funnel. In the same time, one part of the media is passed through the small channels towards the tube turbulator exit, where vortexes and turbulences are created and also higher flow rates, which carry dirt particles through the assembly. This prevents dirt collection, control and dosing problems.

The invention claimed is:
1. A tube flow turbulator for use in a closed pipeline system upstream of a control assembly, the tube flow turbulator comprising:
  (a) a first flange part;
  (b) a second cone part;
  (c) a third cone part;
  (d) a circular channel between the second cone part and the third cone part; and
  (e) a passageway extending through the first flange part, the second cone part, and the third cone part for passage of a first part of a fluid medium through the tube flow turbulator;
 wherein the second cone part and the third cone part comprise cone-shaped injectors in the passageway of the first part of the fluid medium;
 wherein the second cone part has small first channels and the third cone part has small second channels for passage of a second part of the fluid medium towards a tube flow turbulator exit;
 wherein the second part of the fluid medium reenters into the first part of the fluid medium to create vortexes and turbulances in the fluid medium; and
 wherein the circular channel connects the small first channels with the small second channels.

2. The tube flow turbulator according to claim 1, wherein the three parts of the tube flow turbulator are connected by screwing onto each other.

* * * * *